(12) United States Patent
Shima et al.

(10) Patent No.: US 8,239,684 B2
(45) Date of Patent: Aug. 7, 2012

(54) SOFTWARE IC CARD SYSTEM, MANAGEMENT SERVER, TERMINAL, SERVICE PROVIDING SERVER, SERVICE PROVIDING METHOD, AND PROGRAM

(75) Inventors: Shigeyoshi Shima, Tokyo (JP); Yukiko Endo, Tokyo (JP)

(73) Assignee: NEC Corporation, Tokyo (JP)

( * ) Notice: Subject to any disclaimer, the term of this patent is extended or adjusted under 35 U.S.C. 154(b) by 375 days.

(21) Appl. No.: 12/527,690

(22) PCT Filed: Jan. 17, 2008

(86) PCT No.: PCT/JP2008/050482
§ 371 (c)(1),
(2), (4) Date: Aug. 18, 2009

(87) PCT Pub. No.: WO2008/117550
PCT Pub. Date: Oct. 2, 2008

(65) Prior Publication Data
US 2010/0122094 A1   May 13, 2010

(30) Foreign Application Priority Data
Mar. 28, 2007   (JP) ................................. 2007-084571

(51) Int. Cl.
*H04L 29/06* (2006.01)
(52) U.S. Cl. ........................... 713/185; 713/182; 726/10
(58) Field of Classification Search .................. 726/7, 9, 726/10; 713/177, 182, 185
See application file for complete search history.

(56) References Cited

U.S. PATENT DOCUMENTS

| 5,677,952 A | * | 10/1997 | Blakley et al. | ................ 713/189 |
| 6,157,721 A | * | 12/2000 | Shear et al. | ................... 380/255 |

FOREIGN PATENT DOCUMENTS

| JP | 2003085144 A | 3/2003 |
| JP | 2003531447 A | 10/2003 |
| JP | 2003338816 A | 11/2003 |
| JP | 2004094543 A | 3/2004 |
| JP | 2006244420 A | 9/2006 |
| JP | 2006251868 A | 9/2006 |

OTHER PUBLICATIONS

International Search Report for PCT/JP2008/050482 mailed Mar. 25, 2008.

* cited by examiner

*Primary Examiner* — Edward Zee

(57) ABSTRACT

A management server calculates a hash value of software for providing a service, generates a first software area from software which is provided a second electronic signature, provides a third electronic signature to user information provided with a first electronic signature transmitted from a terminal, to the hash value, and to user management information, encrypts a second software area generated from the third electronic signature, user information, from hash value, and from user management information using a common key of the management server and service providing server, combines the first software area and encrypted second software area to create a software IC card, encrypts the software IC card using a public key of the terminal, and transmits the encrypted software IC card to the terminal.

17 Claims, 11 Drawing Sheets

SOFTWARE IC CARD SYSTEM, MANAGEMENT SERVER, TERMINAL, SERVICE PROVIDING SERVER, SERVICE PROVIDING METHOD, AND PROGRAM

The present application is the National Phase JP/2008/050482,filed Jan. 17, 2008, which is based upon and claims the priority of Japanese Patent Application No. 2007-084571 filed Mar. 28, 2007, the disclosure of which is incorporated herein by reference in its entirety.

TECHNICAL FIELD

The present invention relates to a software IC card system, a management server, a terminal, a service providing server, a service providing method, and a program which utilize a network.

BACKGROUND ART

In recent years, IC cards (Integrated Circuit Cards) which have an IC (Integrated Circuit) chip built into a plastic card have become increasingly popular. This IC card is capable of controlling and storing information, and has a larger storage capacity than general magnetic cards. The IC card is also characterized by its resistance to forgery and abuse and by excellent security for information stored therein. Accordingly, an IC card which has personal information written therein can be used to authenticate the owner of the IC card and provide services suitable for the owner.

To utilize this IC card, a method has been employed to read information written in the IC card by bringing the IC card into contact with an IC card reader/writer or by exposing the IC card to the IC card reader/writer.

Also, a technology has been developed to pass proper authentication information to a server which manages authentication information for authenticating individuals in response to a request from a client which is a user.

Also, in a developed system, when an application server is added onto a network for providing applications, authentication information is generated for the added application server, and the authentication information is registered in a member information database, so that a member who utilizes an application is allowed to utilize the application (see, for example, JP-2006-251868A).

However, with a physical IC card such as a conventional IC card, when an IC card is shared by a plurality of persons, the IC card has a problem in that a person who carries the IC card must give the IC card to the user by hand or by sending it through the mail.

Also, in the aforementioned technology to pass proper authentication information from a server to a client, a service provider cannot be provided with software for processing with an IC card.

Further, the system described in JP-2006-251868A has a problem in that the system must individually register even member information for members who utilize applications for which authentication information has been registered.

DISCLOSURE OF THE INVENTION

To solve the problems described above, it is an object of the present invention to provide a software IC card system, a management server, a terminal, a service providing server, a service providing method, and a program which are capable of providing services which can be switched or changed through a network.

To achieve the above object, the present invention provides a software IC card system comprising a terminal, a service providing server for providing a service to the terminal, and a management server for managing software for providing the service. The software IC card system is characterized in that:

the terminal provides a first electronic signature to user information which enables a user to be identified, and transmits the user information appended with the first electronic signature to the management server, the management server calculates a hash value for the software, gives a second electronic signature to the software, generates a first software area from the software which has been given the second electronic signature, gives a third electronic signature to the user information appended with the first electronic signature and user management information for managing the hash value and the user, generates a second software area from the user information appended with the third electronic signature and the first electronic signature, the hash value, and the user management information, encrypts the second software area using a common key of the management server and the service providing server, combines the first software area and the encrypted second software area to create a software IC card, encrypts the created software IC card using a public key of the terminal, and transmits the software IC card to the terminal.

Also, a management server is configured to manage software for providing a service from a service providing server to a terminal which transmits user information appended with a first electronic signature, wherein:

the management server calculates a hash value for the software, gives a second electronic signature to the software, generates a first software area from the software which has been given the second electronic signature, gives a third electronic signature to the user information appended with the first electronic signature and user management information for managing the hash value and the user, generates a second software area from the user information appended with the third electronic signature and the first electronic signature, the hash value, and the user management information, encrypts the second software area using a common key of the management server and the service providing server, combines the first software area and the encrypted second software area to create a software IC card, encrypts the created software IC card using a public key of the terminal, and transmits the software IC card to the terminal.

Also, a terminal is connected to a service providing server for providing a service and a management server for managing software for providing the service, wherein:

the terminal gives an electronic signature to user information which enables a user to be identified, using a secret key of the terminal itself stored in a hardware security module uniquely mounted in the terminal, and transmits the user information appended with the electronic signature to the management server.

A service providing server is configured to provide a service to a terminal and is connected to a management server for managing software for providing the service, wherein:

the service providing server verifies whether or not an electronic signature given to a first software area stored in a software IC card transmitted from the terminal is attached by the management server, verifies whether or not an electronic signature given to a second software area stored in the software IC card is attached by the management server, verifies whether or not an electronic signature given to user information stored in the second software area is attached by the terminal which has transmitted the software IC card, and provides a service to the terminal when the results of all the verifications are correct.

The present invention also provides a service providing method in a software IC card system comprising a terminal, a service providing server for providing a service to the terminal, and a management server for managing software for providing the service. The service providing method comprises the processing of:

the terminal giving a first electronic signature to user information which enables a user to be identified;

the terminal transmitting the user information appended with the first electronic signature to the management server;

the management server calculating a hash value for the software;

the management server giving a second electronic signature to the software;

the management server generating a first software area from the software which has been given the second electronic signature;

the management server giving a third electronic signature to the user information appended with the first electronic signature and user management information for managing the hash value and the user;

the management server generating a second software area from the user information appended with the third electronic signature and the first electronic signature, the hash value, and the user management information;

the management server encrypting the second software area using a common key of the management server and the service providing server;

the management server combining the first software area and the encrypted second software area to create a software IC card;

the management server encrypting the created software IC card using a public key of the terminal; and the management server transmitting the software IC card to the terminal.

Also, a program for providing a service causes a management server, that manages software for providing a service from a service providing server to a terminal which transmits user information appended with a first electronic signature, to execute the procedures of:

calculating a hash value for the software;

giving a second electronic signature to the software;

generating a first software area from the software which has been given the second electronic signature;

giving a third electronic signature to the user information appended with the first electronic signature and user management information for managing the hash value and the user;

generating a second software area from the user information appended with the third electronic signature and the first electronic signature, the hash value, and the user management information;

encrypting the second software area using a common key of the management server and the service providing server;

combining the first software area and the encrypted second software area to create a software IC card;

encrypting the created software IC card using a public key of the terminal; and transmitting the software IC card to the terminal.

Also, a program causes a terminal connected to a service providing server for providing a service and a management server for managing software for providing the service, to execute the procedures of:

giving an electronic signature to user information which enables a user to be identified, using a secret key of the terminal itself stored in a hardware security module uniquely mounted in the terminal; and transmitting the user information appended with the electronic signature to the management server.

Also, a program causes a service providing server that provides a service to a terminal and that is connected to a management server for managing software that provides the service, to execute the procedures of:

verifying whether or not an electronic signature given to a first software area stored in a software IC card transmitted from the terminal is attached by the management server;

verifying whether or not an electronic signature given to a second software area stored in the software IC card is attached by the management server;

verifying whether or not an electronic signature given to user information stored in the second software area is attached by the terminal which has transmitted the software IC card; and providing a service to the terminal when the results of all the verifications are correct.

As described above, in the present invention, the terminal transmits user information appended with a first electronic signature to the management server. The management server calculates a hash value for software, generates a first software area from software appended with a second electronic signature, gives a third electronic signature to the user information appended with the first electronic signature, the hash value, and user management information, generates a second software area from the user information appended with the third electronic signature and first electronic signature, the hash value, and the user management information, encrypts the second software area using a common key of the management server and service providing server, combines the first software area and the encrypted second software area to create a software IC card, encrypts the software IC card using a public key of the terminal, and transmits the encrypted software IC card to the terminal. It is therefore possible to provide a service which can be exchanged or changed through a network.

BEST MODE FOR CARRYING OUT THE INVENTION

In the following, an embodiment of the present invention will be described with reference to the drawings.

Figure 1:
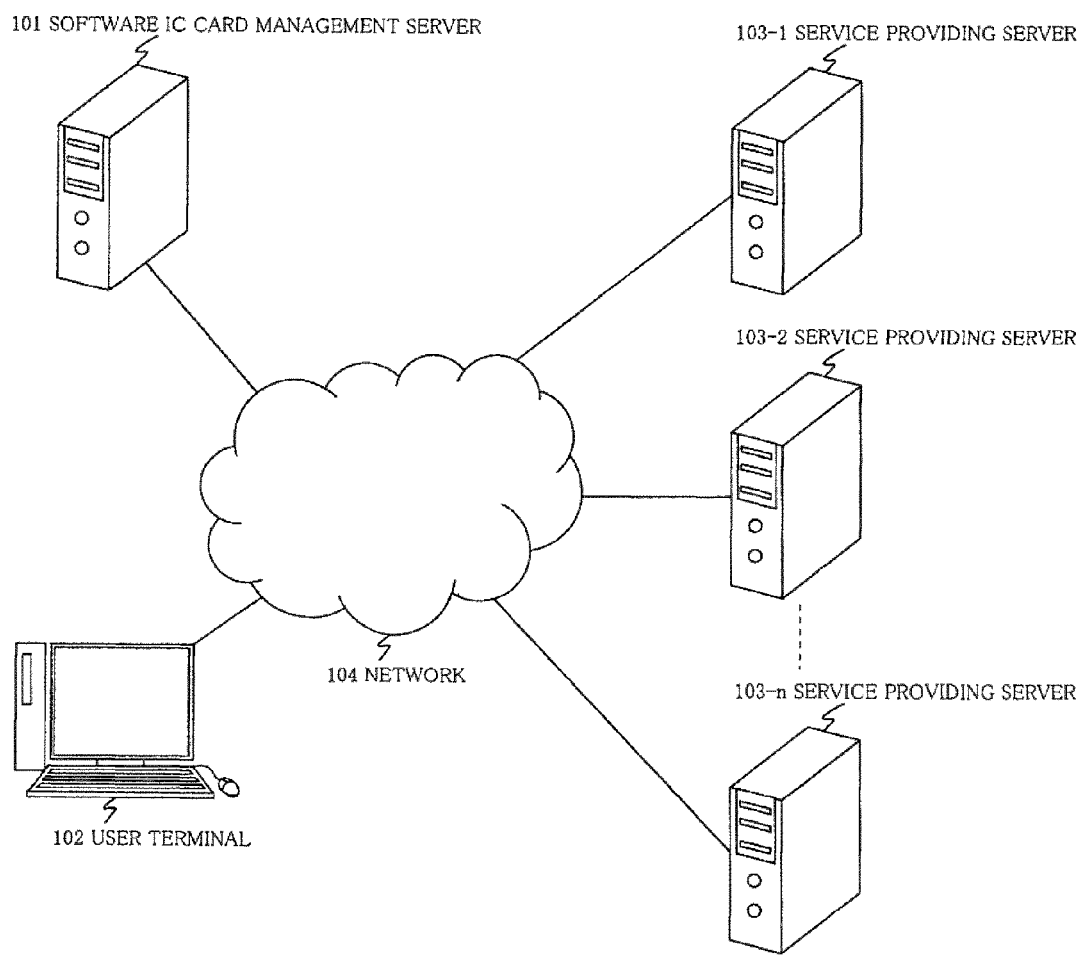
FIG. 1 A diagram showing an embodiment of a software IC card system according to the present invention.

FIG. 1 is a diagram showing one embodiment of a software IC card system according to the present invention.

As shown in FIG. 1, in this embodiment, software IC card management server 101, user terminal 102, and service providing servers 103-1-103-n are connected through network 104.

Software IC card management server 101 is a management server for creating a software IC card based on user information provided from user terminal 102 and software provided from service providing servers 103-1-103-n. Also, these pieces of information are stored as a database for management.

Figure 2:
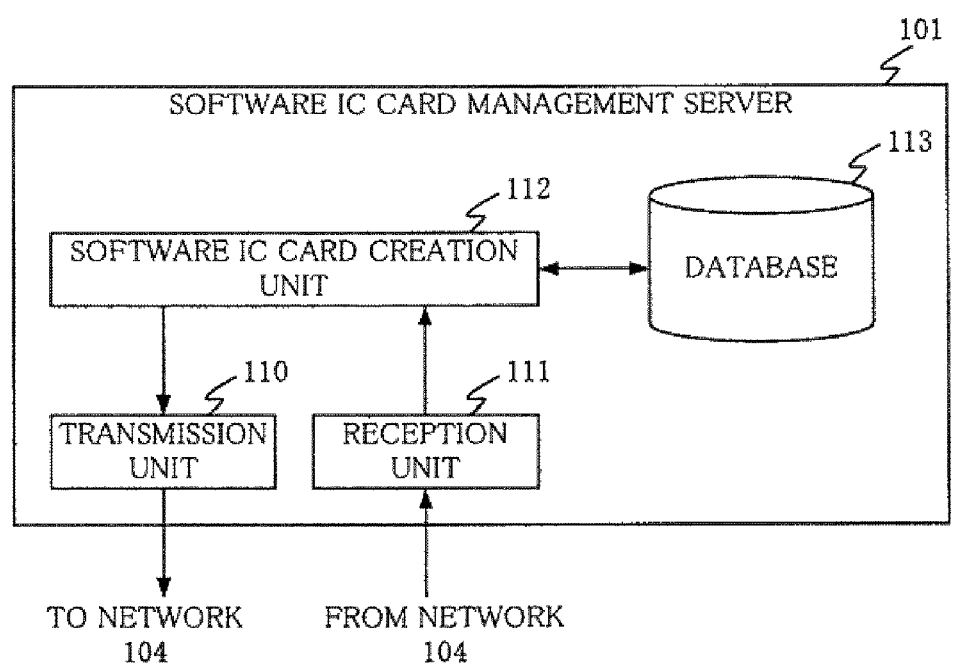
FIG. 2 A block diagram showing an exemplary configuration of a software IC card management server shown in FIG. 1.

FIG. 2 is a block diagram showing an exemplary configuration of software IC card management server 101 shown in FIG. 1.

As shown in FIG. 2, software IC card management server 101 shown in FIG. 1 is provided with transmission unit 110, reception unit 111, software IC card creation unit 112, and database 113.

Reception unit 111 receives information required to create a software IC card from user terminal 102 and service providing servers 103-1-103-n through network 104.

Software IC card creation unit 112 creates a software IC card based on the information received by reception unit 111.

Transmission unit 110 transmits a software IC card created by software IC card creation unit 112 to user terminal 102 through network 104.

Database 113 stores information received by reception unit 111.

Figure 3:
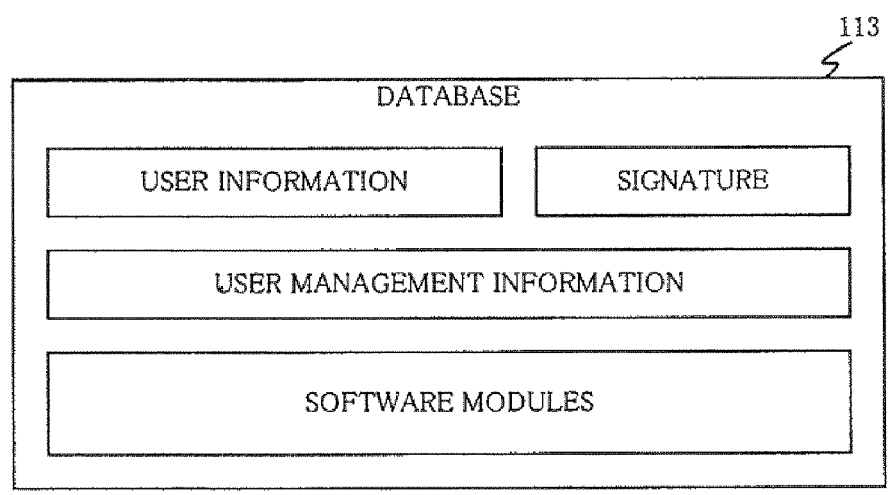
FIG. 3 A diagram showing an exemplary structure of a database shown in FIG. 2.

FIG. 3 is a diagram showing an exemplary structure of database 113 shown in FIG. 2.

As shown in FIG. 3, database 113 shown in FIG. 2 stores user information, a signature, software modules, and user management information. Details of such information will be described later.

User terminal 102 is a terminal manipulated by a user who utilizes the present system. User terminal 102 may be a general PC (personal computer), or a mobile terminal such as a portable terminal, or any terminal which can be connected to network 104.

Figure 4:
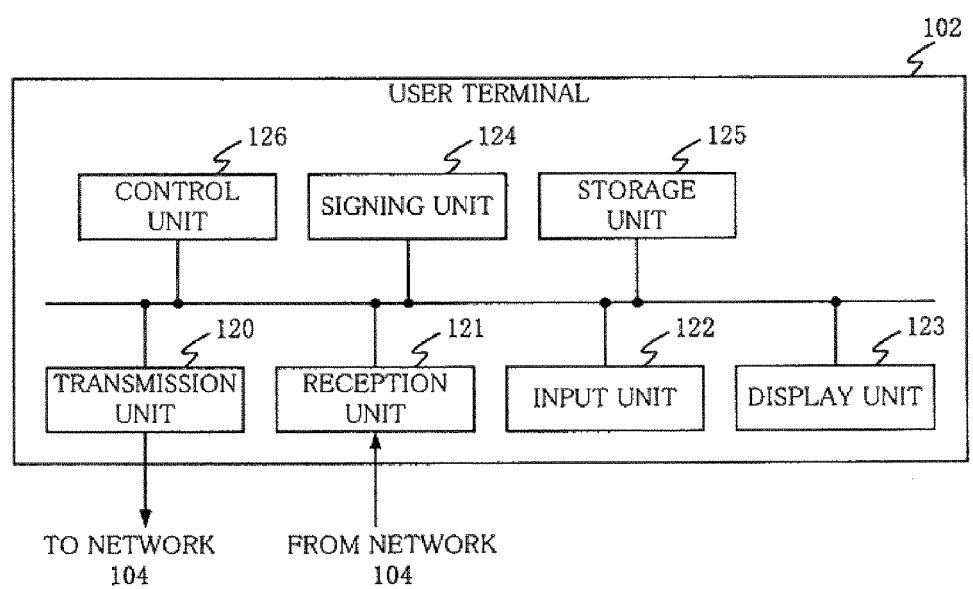
FIG. 4 A block diagram showing an exemplary configuration of a user terminal shown in FIG. 1.

FIG. 4 is a block diagram showing an exemplary configuration of user terminal 102 shown in FIG. 1.

As shown in FIG. 1, user terminal 102 shown in FIG. 1 is provided with transmission unit 120, reception unit 121, input unit 123, display unit 123, signing unit 124, storage unit 125, and control unit 126 for controlling these components.

Input unit 122 is means manipulated by a user to input information. For example, input unit 122 may be a keyboard or a mouse, or input buttons of a portable terminal, a touch panel, and the like.

Display unit 123 displays content input from input unit 122, content transmitted from software IC card management server 101, content transmitted from service providing servers 103-1-103-n, and the like. Display unit 123 may be a general display for displaying information.

Signing unit 124 electronically signs a software IC card and user information obtained from software IC card management server 101 (hereinafter called "signature").

Storage unit 125 stores a signature, a secret key for encryption, and user information on a software IC card in user terminal 102.

Transmission unit 120 transmits information input from input unit 122, user information stored in storage unit 125, or a software IC card to software IC card management server 101 or service providing servers 103-1-103-n through network 104.

Reception unit 121 receives a software IC card transmitted from software IC card management server 101, services transmitted from service providing servers 103-1-103-n, and the like through network 104.

Here, a hardware security module may be employed for implementing signing unit 124. The hardware security module refers to a security module which is uniquely mounted in each general computer and cannot be transported to another computer, and implements security and privacy. The hardware security module is also provided with a memory such that a secret key can be stored in the memory. A key stored in the hardware security module cannot be extracted from the outside. In addition, when a hardware security module mounted in a computer is removed from the computer, the computer is disabled and cannot be accessed. Thus, the security of a software IC card can be ensured by storing a secret key of a user in a hardware security module. The hardware security module is generally configured in combination with a single chip or its peripheral circuit, and exemplified by TPM (Trusted Platform Module).

Service providing servers 103-1-103-n are servers for providing services to users who utilize the present system.

Figure 5:
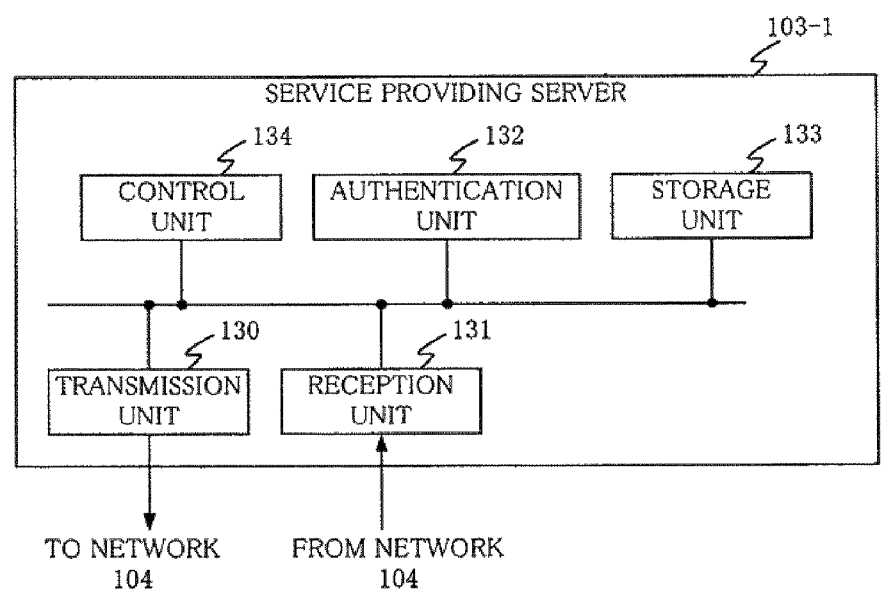
FIG. 5 A block diagram showing an exemplary configuration of a service providing server shown in FIG. 1.

FIG. 5 is a block diagram showing an exemplary configuration of service providing server 103-1 shown in FIG. 1. In this regard, service providing servers 103-2-103-n shown in FIG. 1 are similar in configuration to service providing server 103-1 shown in FIG. 5.

As shown in FIG. 5, service providing server 103-1 shown in FIG. 1 is provided with transmission unit 130, reception unit 131, authentication unit 132, storage unit 133, and control unit 134 for controlling these components.

Storage unit 133 stores contents of services provided to users, a public key provided from software IC card management server 101, and the like.

Transmission unit 130 makes a request to user terminal 102 for a software IC card through network 104, and transmits the contents of a service to user terminal 102 for use.

Reception unit 131 receives a software IC card transmitted from user terminal 102.

Authentication unit 132 authenticates a software IC card received by reception unit 131 to see whether or not it is correct.

In the following, a description will be given of processes in the software IC card system configured as described above using sequence diagrams. First described is a process for registering a software IC card.

Figure 6:
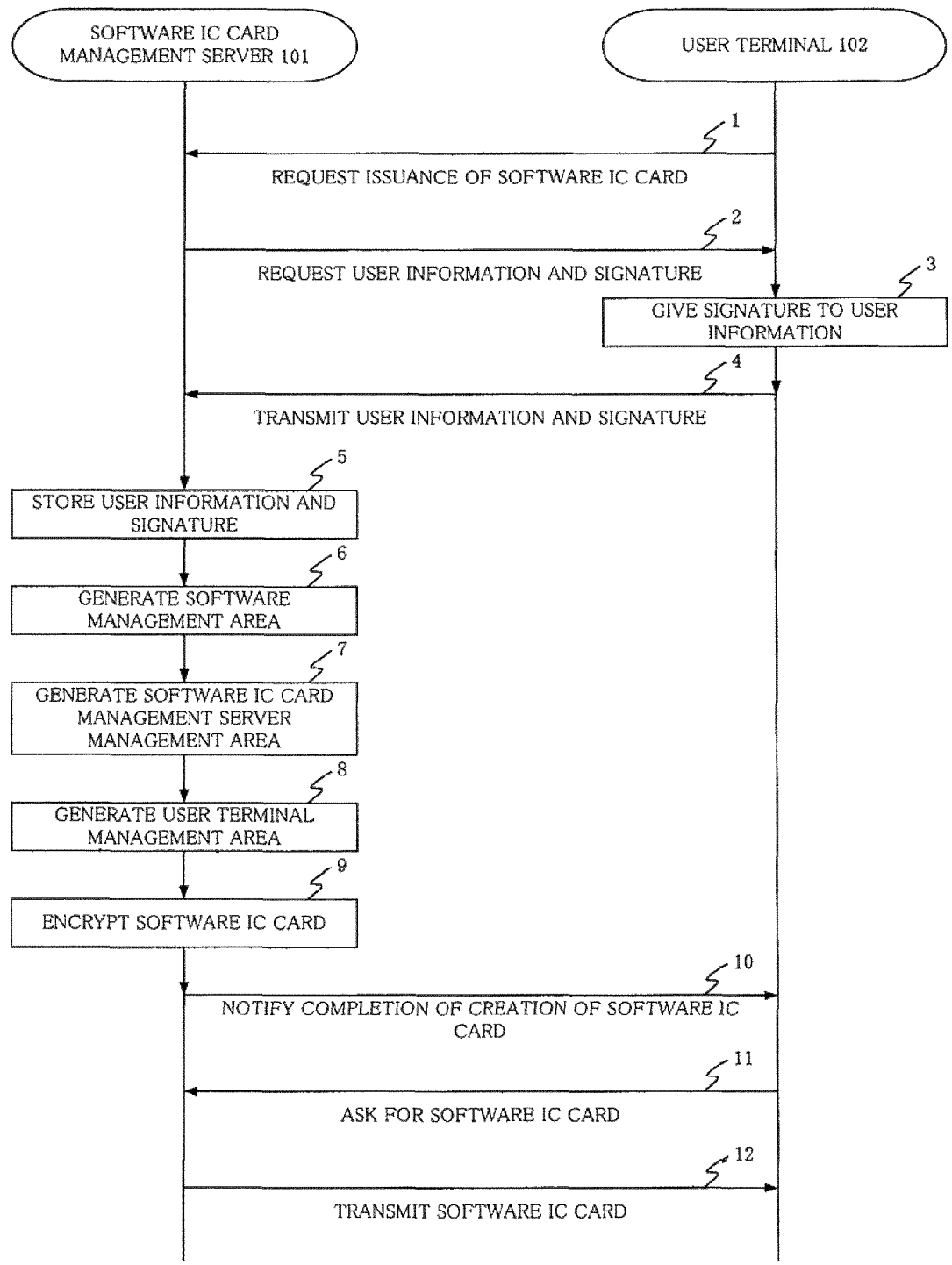
FIG. 6 A sequence diagram for describing a process for registering a software IC card in the software IC card system shown in FIGS. 1 to 5.

FIG. 6 is a sequence diagram for describing a process for registering a software IC card in the software IC card system shown in FIGS. 1 to 5. This registration process is performed between software IC card management server 101 and user terminal 102. Also, the registration process will be described giving, as an example, a scenario where a user wishes a service that is provided from service providing server 103-1.

First, as the user manipulate input devices for issuing a software IC card using input unit 122 of user terminal 102, software IC card management server 101 is requested to issue of a software IC card from transmission unit 120 of user terminal 102 through network 104 at step 1. This request for issuance may involve invoking software for registering of a software IC card at user terminal 102, and making a request in accordance with content displayed on display unit 123 after the software has been invoked. Alternatively, a web page for registering a software IC card may be accessed from user terminal 102 through network 104 to make a request in accordance with the content of the page displayed on display unit 123.

Figure 7:
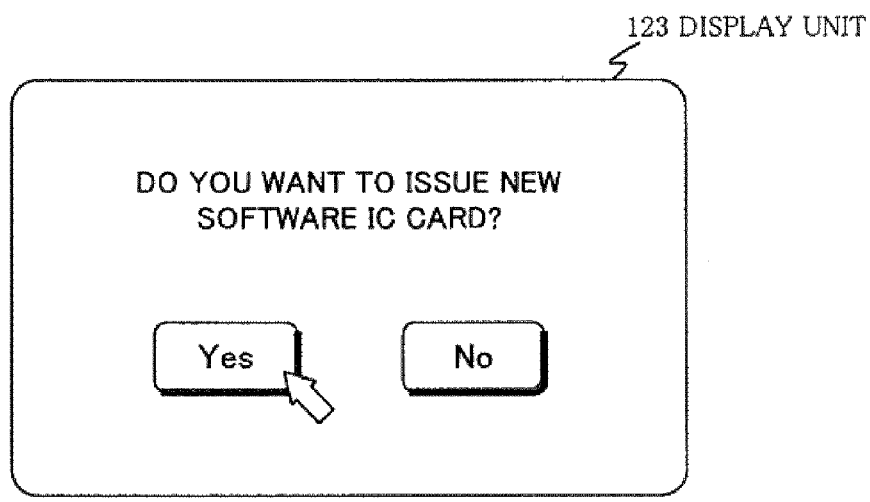
FIG. 7 A diagram showing an exemplary screen displayed on a display unit shown in FIG. 4 for issuing a software IC card.

FIG. 7 is a diagram showing an exemplary screen for issuing a software IC card displayed on display unit 123 shown in FIG. 4.

As shown in FIG. 7, display unit 123 displays options as to whether or not a new software IC card will be issued. "Yes" is selected when a new software IC card is to be issued, while "No" is selected when no software IC card is issued. A selection method in this event may allow the user to move a displayed cursor using a mouse to select a desired option, or to manipulate keys or buttons to select a desired option.

Also, with this selection, the request for the issuance of a software IC card from user terminal 102 to software IC card management sever 101 is made by a predetermined signal for issuing a request (hereinafter called the "issuance request signal") which is transmitted from user terminal 102 to software IC card management server 101 through network 104. This issuance request signal only needs to allow user terminal 102 and software IC card management server 101 to recognize that this is a signal for requesting the issuance, and is not particularly defined herein with respect to its signal format.

When the issuance request signal transmitted from user terminal 102 is received at reception unit 111 of software IC card management server 101 through network 104, software IC card creation unit 112 requests user terminal 102 for user information and a digital signature through transmission unit 110 at step 2. The user information and a digital signature are information required to issue a software IC card.

Also, this request involves a predetermined signal for requesting information (hereinafter called the "information request signal") which is transmitted from transmission unit 110 of software IC card management server 101 to user terminal 102 through network 104. This information request signal only needs to allow software IC card management server 101 and user terminal 102 to recognize that this is a signal for requesting information, and is not particularly defined herein with respect to its signal format.

When the information request signal transmitted from software IC card management server 101 is received at reception unit 121 of user terminal 102 through network 104, user terminal 102 displays a form for entering user information on display unit 123. As the user manipulates input unit 122 to enter user information in accordance with the form displayed on display unit 123, a first electronic signature is given to the entered user information at signing unit 124 at step 3. Here, the user information may be previously stored in storage unit 125, and the signature may be given to the user information previously stored in storage unit 125. This signature is attached using a secret key stored in storage unit 125 for the user information. Additionally, when signing unit 124 is a hardware security module as mentioned above, a key for use in signing may be a common key shared by software IC card management server 101 and user terminal 102. Also, the user information herein may be any information which allows the user to be identified, and may be a name, a previously assigned identification number, or the like.

Subsequently, at step 4, the user information and signature are transmitted from transmission unit 120 to software IC card management server 101 through network 104.

When the user information and signature transmitted from user terminal 102 are received at reception unit 111 of software IC card management server 101, the received user information and signature are stored in database 113 by software IC card creation unit 112 at step 5.

Then, at step 6, software IC card creation unit 112 incorporates software modules (utilization point management and the like) utilized by service providing server 103-1, and generates a software management area which is a first software area on a software IC card. The software modules utilized by service providing server 103-1 have been previously stored in database 113. Here, software IC card creation unit 112 also calculates a hash value for the software modules. This hash value is designated as a software configuration value. Further, the software modules are given a second electronic signature by use of a secret key of software IC card management server 101, and this signature is also included in the software management area.

Subsequently, a signature of software IC card management server 101, which is a third electronic signature, is given to the user information and signature stored in database 113, user management information, software configuration value, and version information. Here, user management information refers to detailed information such as for making contact with the user and the like, which is previously stored in database 113. This signature is also made by use of the secret key previously stored in database 113. Then, at step 7, these pieces of information (user information, signature, user management information, software configuration value, and version information) and the signature are encrypted by use of a common key previously stored in database 113, and a software IC card management server management area is generated as a second software area. This common key is a key that is common to software IC management server 101 and service providing server 103-1.

Also, at step 8, software IC card creation unit 112 generates a user terminal management area which is a third software are. This user terminal management area includes information on service providers (utilization point and the like) and signatures of the service providers.

Then, the generated software management area, software IC card management server management area, and user terminal management area are combined to build a software IC card. At step 9, the built software IC card is encrypted in software IC card creation unit 112 using the public key of user terminal 102, which is an encryption key. Alternatively, when signing unit 124 of user terminal 102 is a hardware security module, as mentioned above, the encryption key for use in the encryption may be the key that is common to software IC card management server 101 and user terminal 102.

As the software IC card is encrypted, user terminal 102 is notified of the completion of the creation of a software IC card at step 10. This creation completion notice involves transmitting a signal indicative of the completion of the creation of the software IC card from transmission unit 110 to user terminal 102 through network 104, where no format is particularly defined herein for the signal.

After user terminal 102 is notified of the completion of the creation of a software IC card from software IC card management server 101, when user terminal 102 males a request to software IC card management server 101 for a software IC card at step 11, the software IC card is transmitted from transmission unit 110 of software IC card management server 101 to user terminal 102 through network 104 at step 12. After user terminal 102 receives the software IC card transmitted from software IC card management server 101, the software IC card is available at user terminal 102. In this regard, a request for a software IC card from user terminal 102 to software IC card management server 101 also involves a signal indicative of a request for a software IC card, which is transmitted from transmission unit 120 of user terminal 102 to software IC card management server 101 through network 104, where no signal format is particularly defined herein.

Figure 8:
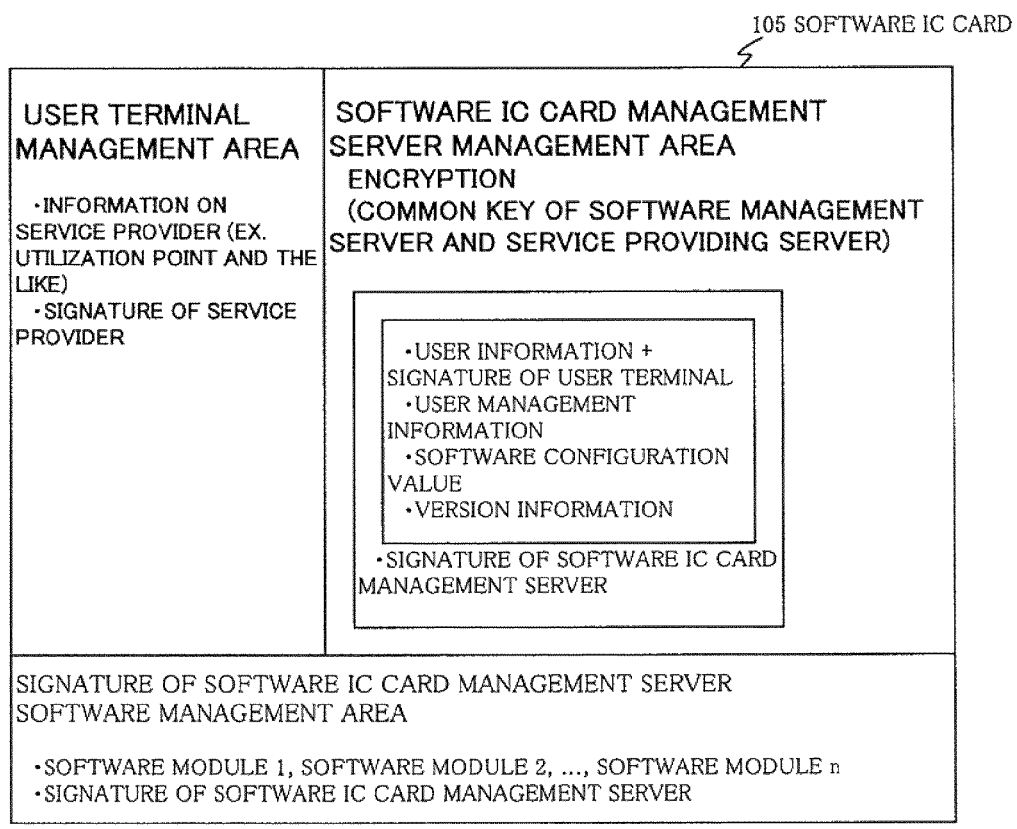
FIG. 8 A diagram showing an exemplary configuration of a software IC card created by a software IC card creation unit shown in FIG. 2.

FIG. 8 is a diagram showing an exemplary configuration of a software IC card created by software IC card creation unit 112 shown in FIG. 2.

As shown in FIG. 8, software IC card 105 created by software IC card creation unit 112 shown in FIG. 2 comprises a user terminal management area, a software IC card management server management area, and a software management area.

The software management area is an area of software for processing software IC card 105, and cannot be processed when the configurations of software modules have been modified. Software management area includes software modules, and the signature of software IC card management server 101.

The software IC card management server management area in turn is an area utilized by software IC card management server 101 and service providing server 103-1, and is an area which cannot be referenced from user terminal 102. The software IC card management server management area comprises user information, the signature of the user terminal given to the user information, user management information, software configuration values, version information, and the signature of software IC card management server 101 given to these items. In this regard, they are encrypted with the common key of software IC card management server 101 and service providing server 103-1.

The user terminal management area in turn is an area available to user terminal 102 and service providing server 103-1, and is an area where the user can reference information written by the service provider using user terminal 102. The user terminal management area includes information on the service provider (utilization points and the like) and a signature of the service provider.

Next, a description will be given of a process for utilizing a software IC card.

Figure 9:
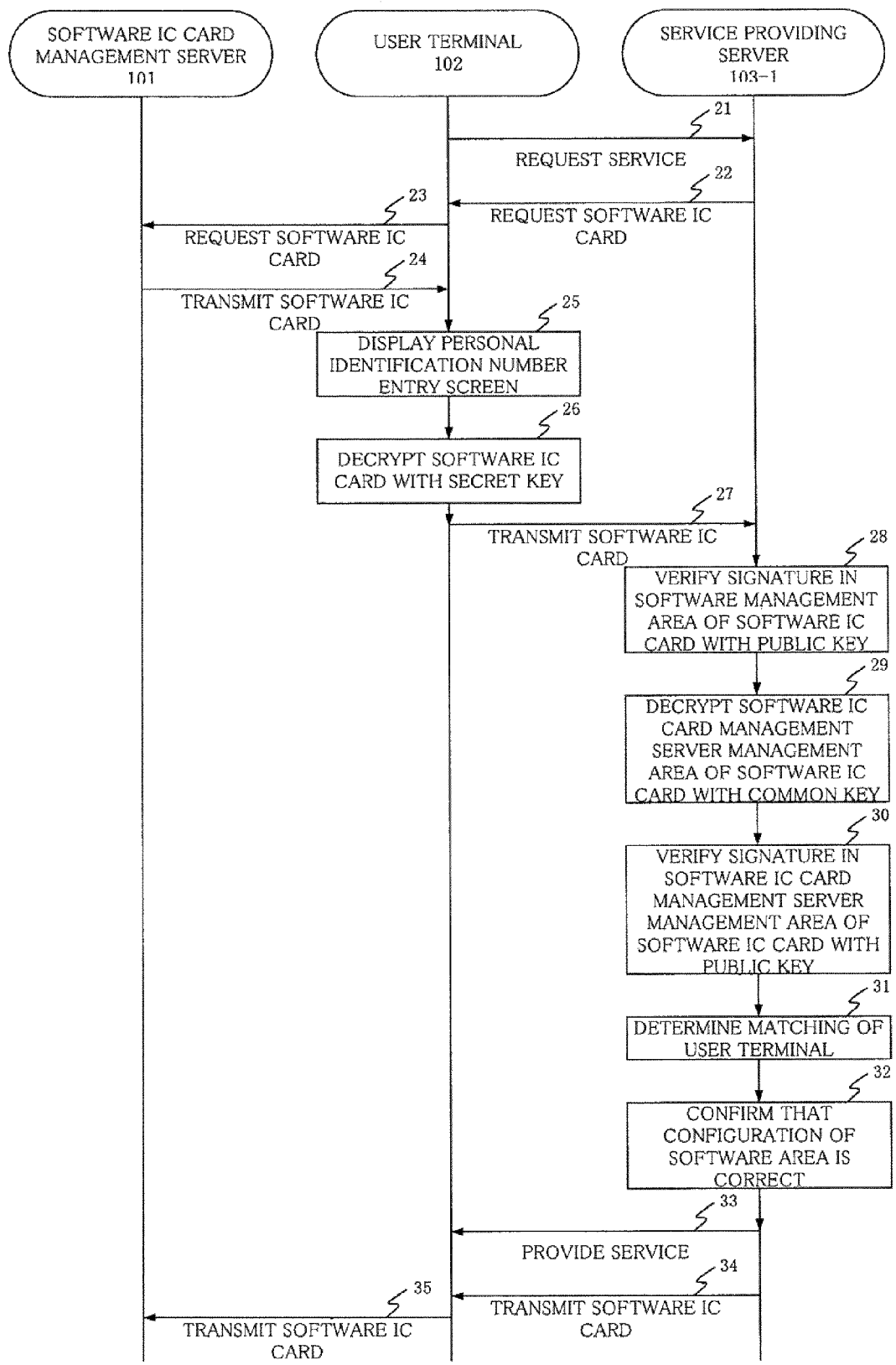
FIG. 9 A sequence diagram for describing a process for utilizing a software IC card in the software IC card system shown in FIGS. 1 to 5.

FIG. 9 is a sequence diagram for describing a process for utilizing a software IC card in the software IC card system shown in FIGS. 1 to 5. This utilization process is performed among software IC card management server 101, user terminal 102, and service providing servers 103-1-103-*n*. Here, the process will be described giving, as an example, a scenario where the user desires a service provided from service providing server 103-1.

First, as the user manipulates input devices to make a request to service providing server 103-1 for the provision of a service using input unit 122 of user terminal 102, service providing server 103-1 is requested to provide the service from transmission unit 120 of user terminal 102 through network 104 at step 21. This request may involve invoking software for a request for the provision of a service in user terminal 102, and making the request in accordance with content displayed on display unit 123 after the software has been invoked. Alternatively, a web page for requesting for the provision of a service may be accessed from user terminal 102 through network 104 to make the request in accordance with the content of the page displayed on display unit 123.

Also, this request for the provision of a service from user terminal 102 to service providing server 103-1 involves a predetermined signal for a request for the provision of a service (hereinafter called the "service provision request signal"), which is transmitted from user terminal 102 to service providing server 103-1 through network 104. This service provision request signal only needs to allow user terminal 102 and service providing server 103-1 to recognize that this is a signal for requesting the provision of a service, and is not particularly defined herein with respect to its signal format.

When the service provision request transmitted from user terminal 102 is received at reception unit 131 of service providing server 103-1 through network 104, service providing server 103-1 make a request to user terminal 102 for a software IC card from transmission unit 130 through network 104 at step 22. This request for a software IC card also involves a signal indicative of a request for a software IC card made from service providing server 103-1 to user terminal 102, which is transmitted from transmission unit 130 of service providing server 103-1 to user terminal 102 through network 104, where the signal is not particularly defined herein with respect to its signal format.

When service providing server 103-1 makes a request to user terminal 102 for a software IC card, user terminal 102 makes a request software IC card management server 101 for the software IC card at step 23. Again, this request involves a signal indicative of a request for the software IC card made from user terminal 102 to software IC card management server 101, which is transmitted from transmission unit 120 of user terminal 102 to software IC card management server 101 through network 104, where the signal is not particularly defined herein with respect to its signal format.

Since the request is recognized by software IC card management server 101, the software IC card created through the aforementioned registration process is transmitted from transmission unit 110 of software IC card management server 101 to user terminal 102 through network 104 at step 24.

Since the software IC card is received at reception unit 121 of user terminal 102, control unit 126 displays a screen for entering a personal identification number on display unit 123 at step 25. This is intended to activate the software IC card. The screen displayed on display unit 123 may be a general screen for entering a personal identification number.

The user manipulates input unit 122 to enter his personal identification number in accordance with the screen displayed on display unit 123, and when the entered personal identification number is determined to be correct, the secret key previously stored in storage unit 125 becomes available, so that the software IC card is decrypted using the decryption key at step 26. This decryption key used herein is paired with the encryption key used for encryption at step 9.

As the software IC card is decrypted, the decrypted software IC card is transmitted from transmission unit 120 to service providing server 103-1 through network 104 at step 27.

When the software IC card transmitted from user terminal 102 is received at reception unit 131 of service providing server 103-1 through network 104, authentication unit 132 verifies the signature in the software management area of the software IC card using the public key of software IC card management server 101 at step 28.

When the result of the verification at step 28 is correct, authentication unit 132 decrypts the software IC card management server management area of the software IC card using the common key at step 29.

Then, at step 30, authentication unit 132 verifies the signature of software IC card management server 101 in the software IC card management server management area of the software IC card using the public key of software IC card management server 101.

When the result of the verification at step 30 is correct, authentication unit 132 verifies the signature of the user terminal in the software IC card management server management area using the public key of user terminal 102, identifies the user terminal, and determines at step 31 whether or not the identified user terminal matches user terminal 102 now in communication.

As a result of the determination at step 31, when it is determined that the identified user terminal matches user terminal 102 now in communication, the configuration of the software management area is confirmed to be correct at step 32 from the software configuration value in the software IC card management server management area.

When the configuration of the software management area is confirmed to be correct, the service is provided from service providing server 103-1 to user terminal 102 at step 33.

After the provision of the service from service providing server 103-1 to user terminal 102, service providing server 103-1 performs processing, for example, for adding points, and the like, using the software modules of the software IC card, provides the signature of service providing server 103-1 to the result of the processing, and describes them in the user terminal management area. Then, the software IC card, which have undergone such processing, is transmitted from transmission unit 130 of service providing server 103-1 to user terminal 102 through network 104 at step 34.

When the software IC card transmitted from service providing server 103-1 is received at reception unit 121 of user terminal 102, the received software IC card is encrypted by signing unit 124 using the public key of user terminal 102. The encrypted software IC card is transmitted from transmission unit 120 to software IC card management server 101 through network 104 at step 35, and is thereby uploaded.

Next, a description will be given of a process for updating a software IC card. Described first is a process for updating user information.

Figure 10:
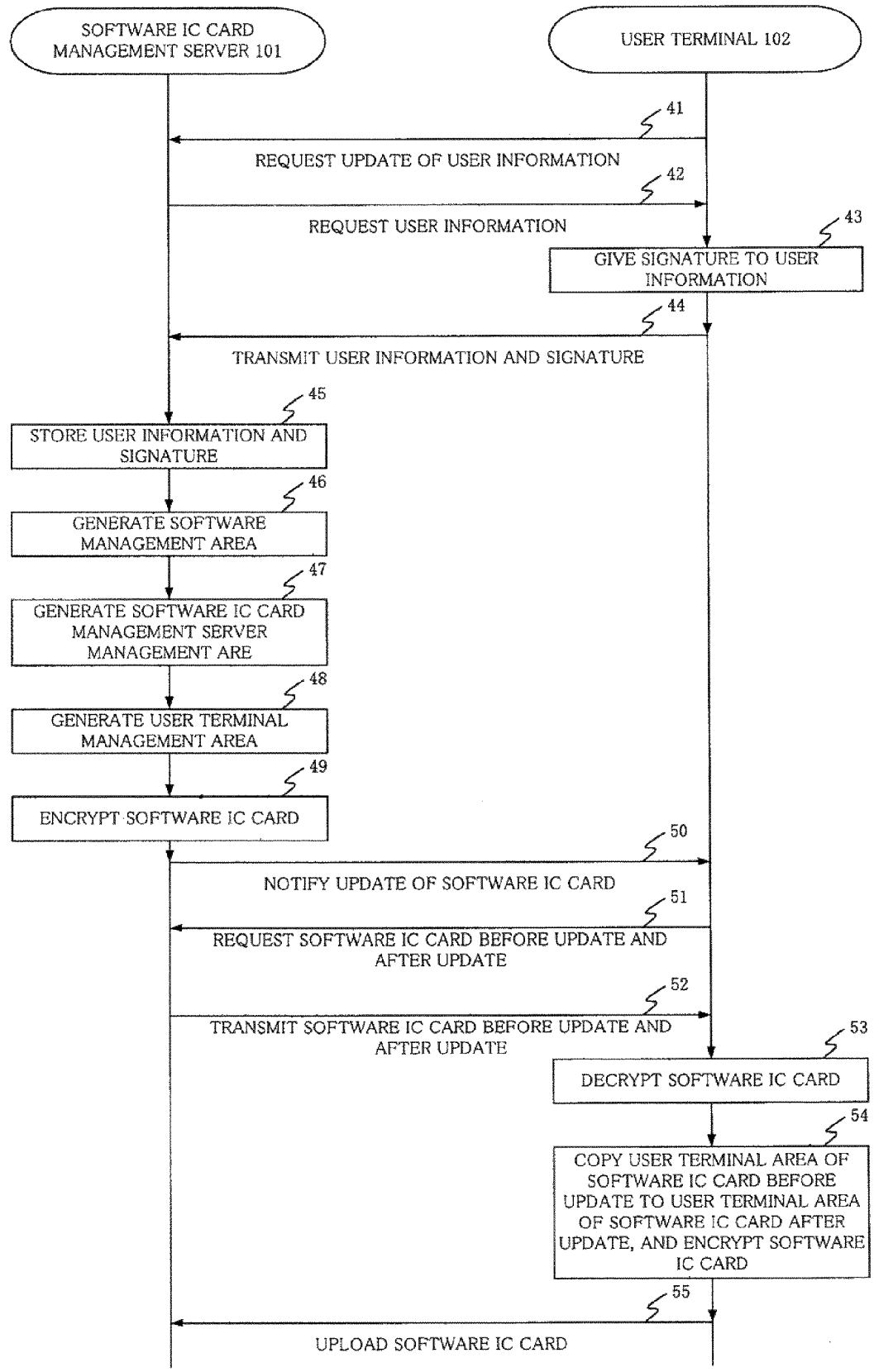
FIG. 10 A sequence diagram for describing a process for updating user information on a software IC card in the software IC card system shown in FIGS. 1 to 5.

FIG. 10 is a sequence diagram for describing a process for updating user information of a software IC card in the software IC card system shown in FIGS. 1 to 5. This updating process is performed between software IC card management server 101 and user terminal 102. Here, the updating process will be described, giving, as an example, a scenario where the user desires a service that is provided from service providing server 103-1.

First, as the user manipulates input devices to request an update of user information using input unit 122 of user terminal 102 a request is made to, software IC card management server 101 for an update of the user information from transmission unit 120 of user terminal 102 through network 104 at step 41. This update request may involve invoking software for updating user information at user terminal 102, and making the request in accordance with the content displayed on display unit 123 after the software has been invoked. Alternatively, a web page for updating the user information may be accessed from user terminal 102 through network 104 to make the request in accordance with the content of the page displayed on display unit 123.

Also, this request for updating user information involves a predetermined signal for a request for an update of the user information (hereinafter called the "user information update request signal"), which is transmitted from user terminal 102 to software IC card management server 101 through network 104. This user information update request signal is only needs to allow user terminal 102 and software IC card management server 101 to recognize that this is a signal for requesting an update of the user information, and is not particularly defined herein with respect to its signal format.

When the user information update request signal transmitted from user terminal 102 is received at reception unit 111 of software IC card management server 101 through network 104, software IC card creation unit 112 makes a request to user terminal 102 for the user information through transmission unit 110 at step 42.

This request also involves a predetermined signal for requesting the user information, transmitted from software IC card management server 101 to user terminal 102 through network 104. This signal only needs to allow software IC card management server 101 and user terminal 102 to recognize that this is a signal for requesting the user information, and is not particularly defined herein with respect to its signal format.

When the signal for requesting the user information, transmitted from software IC card management server 101, is received at reception unit 121 of user terminal 102 through network 104, user terminal 102 displays a form for entering the user information on display unit 123. As the user manipulates input unit 122 to enter the user information in accordance with the form displayed on display unit 123, the signature is given to the entered user information at signing unit 124 at step 43. Here, the user information may be previously stored in storage unit 125, and the signature may be given to the user information previously stored in storage unit 125. This signature is attached using the secret key stored in storage unit 125 and is intended for the user information.

Subsequently, at step 44, the user information and signature are transmitted from transmission unit 120 to software IC card management server 101 through network 104.

When the user information and signature transmitted from user terminal 102 are received at reception unit 111 of software IC card management server 101, the received user information and signature are stored in database 113 by software IC card creation unit 112 at step 45.

Then, software IC card creation unit 112 incorporates software modules that are utilized by service providing server 103-1, and generates a software management area of the software IC card at step 46. The software modules utilized by service providing server 103-1 have been previously stored in database 113. Also, at this time, software IC card creation unit 112 calculates a hash value for the software modules. This hash value is designated as a software configuration value. Also, the software modules are given a signature by use of the secret key of software IC card management server 101, and the signature is also included in the software management area.

Subsequently, a signature is provided to the user information, signature, user management information, software configuration value, and version information, that are all stored in database 113. Here, user management information refers to detailed information on the user, such as a contact and the like, and has been previously stored in database 113. This signature is also provided together with the secret key previously stored in database 113. Then, these pieces of information (user information, signature, user management information, software configuration value, and version information) and signature are encrypted together with the common key previously stored in database 113, and a software IC card management server management area is generated at step 47. This common key is the key that is common to software IC card management server 101 and service providing server 103-1.

Also, at step 48, software IC card creation unit 112 generates a user terminal management area. This user terminal management area includes information on the service provider (utilization point and the like) and the signature of the service provider.

Then, the generated software management area, software IC card management server management area, and user terminal management area are combined to construct a software IC card. At step 49, the constructed software IC card is encrypted in software IC card creation unit 112 together with an encryption key. Here, when the signing unit 124 of user terminal 102 is a hardware security module as mentioned above, the encryption key for use in encryption may be the key that is common to software IC card management server 101 and user terminal 102. This constructed software IC card is an updated software IC card.

When the software IC card is encrypted, user terminal 102 is notified of the update of the software IC card at step 50. This update notification involves a signal which indicates that the software IC card has been updated, transmitted from transmission unit 110 to user terminal 102 through network 104, where the signal is not particularly defined herein with respect to its signal format.

After user terminal 102 is notified of the update of the software IC card from software IC card management server 101, when user terminal 102 makes a request to software IC card management server 101 for the software IC card before the update and the software IC card after the update at step 51, the software IC card before the update and the software IC card after the update are transmitted from transmission unit 110 of software IC card management server 101 to user terminal 102 through network 104 at step 52. When the software IC card before the update and the software IC card after the update, transmitted from software IC card management server 101, are received at reception unit 121 of user terminal 102, control unit 126 decrypts the respective software IC cards using the decryption key of user terminal 102 at step 53. This decryption key is paired with the encryption key used for encryption at step 49. In regard to a request for a software IC card from user terminal 102 to software IC card management server 101, a signal indicative of a request for the software IC card is transmitted from transmission unit 120 of user terminal 102 to software IC card management server 101 through network 104, where the signal is not particularly defined herein with respect to its signal format.

Then, the user terminal management area of the decrypted software IC card before the update is copied to the user terminal management area of the software IC card after the update, and the software IC card after the update is encrypted by use of the public key of user terminal 102 at step 54 after the contents of the user terminal management area are updated on the software IC card after the update.

Subsequently, the encrypted software IC card is transmitted from transmission unit 120 to software IC card management server 101 through network 104 at step 55, and is thereby uploaded.

Next, a description will be given of a process for updating user management information and software.

Figure 11:
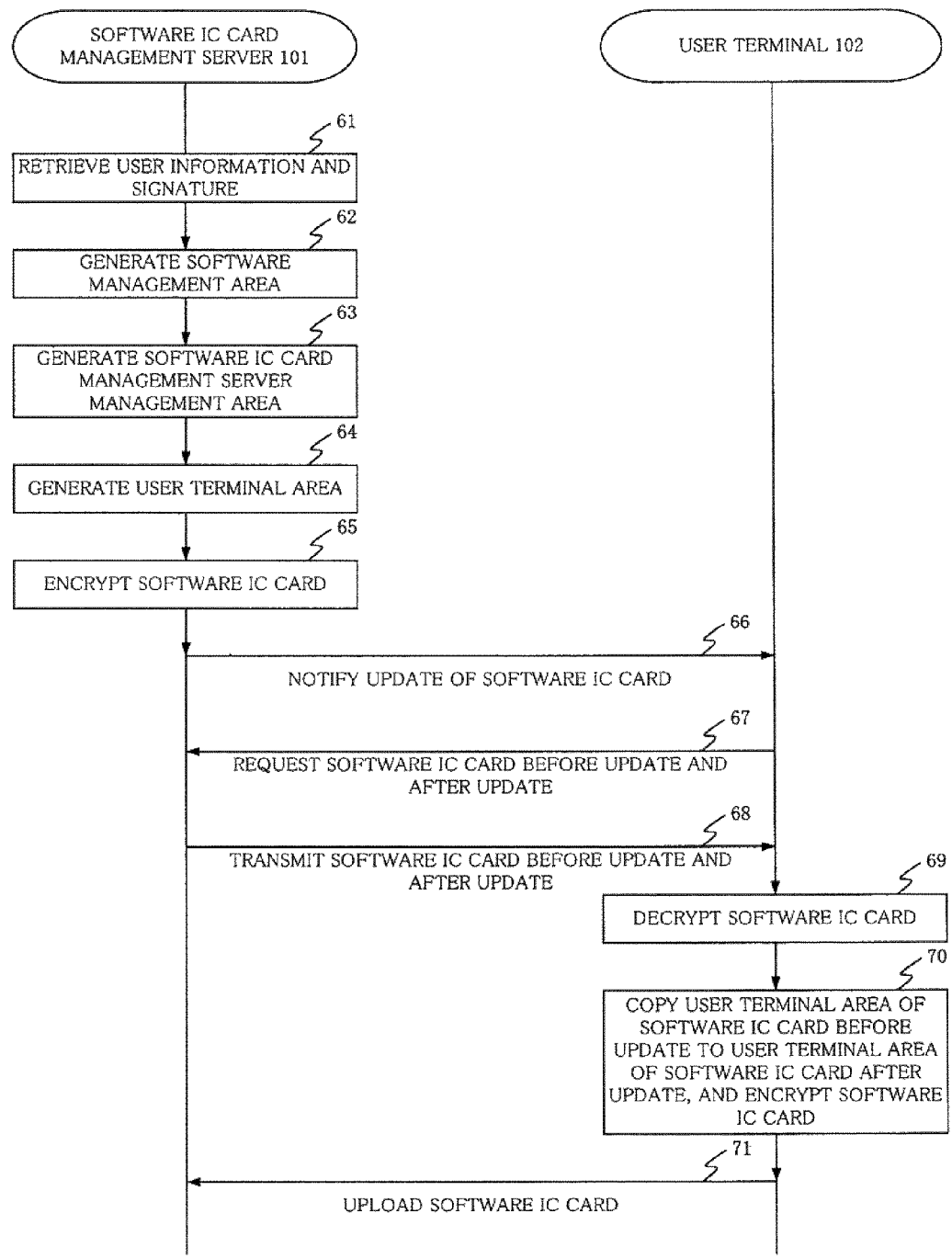
FIG. 11 A sequence diagram for describing a process for updating user management information and software on a software IC card in the software IC card system shown in FIGS. 1 to 5.

FIG. 11 is a sequence diagram for describing a process for updating user management information and software of a software IC card in the software IC card system shown in FIGS. 1 to 5. This update process is performed between software IC card management server 101 and user terminal 102. Here, the update process will be described, giving, as an example, a scenario where the user desires a service provided from service providing server 103-1.

First, at step 61, software IC card creation unit 112 retrieves user information and signature stored in database 113 of software IC card management server 101.

Then, at step 62, software IC card creation unit 112 updates software modules utilized by service providing server 103-1, and generates a software management area of the software IC card. The software modules updated herein have been previously stored in database 113. Here, software IC card creation unit 112 also calculates a hash value for the software modules. This hash value is designated as a software configuration value. Also, the software modules are signed by use of the secret key of software IC card management server 101, and the signature is also included in the software management area.

Subsequently, information is updated, including the user information, signature, user management information, software configuration value, and version information, stored in database 113, and a signature is given to these pieces of information. This signature is also given together with the secret key previously stored in database 113. Then, these pieces of updated information (user information, signature, user management information, software configuration value, and version information) and signature are encrypted together with the common key previously stored in database 113, and a software IC card management server management area is generated at step 63. This common key is the key that is common to software IC card management server 101 and service providing server 103-1.

Also, at step 64, software IC card creation unit 112 generates a user terminal management area. This user terminal management area includes information on the service provider (utilization point and the like) and the signature of the service provider.

Then, the generated software management area, software IC card management server management area, and user terminal management area are combined to construct a software IC card. At step 65, the constructed software IC card is encrypted in software IC card creation unit 112 by use of the public key of user terminal 102. This constructed software IC card serves as an updated software IC card.

When the software IC card is encrypted, user terminal 102 is notified of the update of the software IC card at step 66. This update notification involves a signal which indicates that the software IC card has been updated, transmitted from transmission unit 110 to user terminal 102 through network 104, where the signal is not particularly defined herein with respect to its signal format.

After user terminal 102 is notified of the update of the software IC card from software IC card management server 101, when user terminal 102 requests software IC card management server 101 for the software IC card before the update and the software IC card after the update at step 67, the software IC card before the update and the software IC card after the update are transmitted from transmission unit 110 of software IC card management server 101 to user terminal 102 through network 104 at step 68. When the software IC card before the update and the software IC card after the update transmitted from software IC card management server 101 are received at reception unit 121 of user terminal 102, control unit 126 decrypts the respective software IC cards using the secret key of user terminal 102 at step 69. In regard to a request for a software IC card from user terminal 102 to software IC card management server 101, a signal indicative of a request for the software IC card is transmitted from transmission unit 120 of user terminal 102 to software IC card management server 101 through network 104, where the signal is not particularly defined herein with respect to its signal format.

Then, the user terminal management area of the decrypted software IC card before the update is copied to the user terminal management area of the software IC card after the update, and the resulting software IC card is encrypted by use of the public key of user terminal 102 at step 70.

Subsequently, the encrypted software IC card is transmitted from transmission unit 120 to software IC card management server 101 through network 104 at step 71, and is thereby uploaded.

In the present invention, a program for implementing the functions described above may be recorded on a computer readable recording medium, and the program recorded on the recording medium may be read into a computer for execution. The computer readable recording medium refers to HDD and the like built in a computer, in addition to portable recording media such as a floppy disk (registered trademark), a magneto-optical disk, DVD, CD and the like. The program recorded on the recording medium is read, for example, by CPUs of software IC card management server 101, user terminal 102, and service providing servers 103-1 (software IC card creation unit 112 of software IC card management server 101, control unit 126 of user terminal 102, and control unit 134 of service providing server 103-1), which are equivalent to computers in the present invention, to perform similar processes as those described above under the control of the CPUs.

As described above, the software IC card used in the present invention can be exchanged through a network, unlike a physical IC card.

Also, since processing within an IC card is implemented in software, functions can be flexible. In other words, the IC card can be modified in functional configuration in a flexible manner, thus making it possible to readily update information and functions within the software IC card.

Further, by utilizing a security module which can safely manage keys, the safety of data in the software IC card can be ensured.

As described above, in the software IC card system of the present invention, the management server may transmit a software IC card to a terminal when the terminal requests that the software IC card be transmitted.

Additionally, the terminal may give a first electronic signature using a secret key of the terminal itself stored in a hardware security module uniquely mounted in the terminal.

As well, the terminal may decrypt a software IC card transmitted thereto using the secret key of the terminal itself, and transmit the decrypted software IC card to a service providing server, while the service providing server may verify whether or not a second electronic signature of the software IC card transmitted from the terminal has been attached by the management server, decrypt a second software area using a common key, verify whether or not a third electronic signature has been attached by the management server, further verify whether or not a first electronic signature has been attached by the terminal which has transmitted the software IC card, and provide a service to the terminal when the results of all verifications are correct.

Additionally, the terminal may decrypt a software IC card transmitted from the management server, update a third software area of the decrypted software IC card, encrypt an updated software IC card, and transmit the encrypted software IC card to the management server.

Alternatively, the terminal may decrypt a software IC card transmitted thereto using a decryption key of the terminal itself stored in a hardware security module uniquely mounted in the terminal.

Additionally, the hardware security module may be TPM.

Alternatively, in the service providing method of the present invention as described above, when the terminal makes a request to the management server for the software IC card, the management server may use a process for transmitting the software IC card to the terminal.

Additionally, the terminal may use processing for giving a first electronic signature using the secret key of the terminal itself stored in a hardware security module uniquely mounted in the terminal.

Additionally, the terminal may use processing responsive to a requested software IC card transmitted from the management server for decrypting the software IC card transmitted thereto using the secret key of the terminal itself, the terminal may include a processing operation for transmitting the decrypted software IC card to a service providing server, the service providing server may include a processing operation for verifying whether or not a second electronic signature of the software IC card transmitted from the terminal is attached by the management server, the service providing server may include a processing operation for decrypting a second software area using the common key, the service providing server may include a processing operation for verifying whether or not a third electronic signature is attached by the management server, the service providing server may include a processing operation for verifying whether or not a first electronic signature is attached by the terminal which has transmitted the software Ic card, and the service providing server may include a processing operation for providing a service to the terminal when the results of all the verifications are correct.

Additionally, the terminal may include a processing operation for decrypting a software IC card transmitted from the management server, the terminal may include a processing operation for updating a third software area of the decrypted software IC card, the terminal may include a processing operation for encrypting the updated software IC card, and the terminal may include a processing operation for transmitting the encrypted software IC card to the management server.

Additionally, the terminal may include a processing operation for decrypting a software IC card transmitted thereto using a decryption key of the terminal itself stored in a hardware security module uniquely mounted in the terminal.

As well, when the terminal makes a request the software IC card, the management server may be caused to execute a procedure for transmitting the software IC card to the terminal.

Additionally, when a requested software IC card is transmitted from the management server, the terminal may be caused to execute a procedure for decrypting the software IC card transmitted thereto using the secret key of the terminal itself, and a procedure for transmitting the decrypted software IC card to a service providing server.

Additionally, the terminal may be caused to execute a procedure for decrypting a software IC card transmitted from the management server, a procedure for updating an area which stores terminal management information of the decrypted software IC card, a procedure for encrypting the updated software IC card, and a procedure for transmitting the encrypted software IC card to the management server.

Additionally, the terminal may be caused to execute a procedure for decrypting a software IC card transmitted thereto using the decryption key of the terminal itself stored in a hardware security module uniquely mounted in the terminal.

While the present invention has been described with reference to some embodiments, the present invention is not limited to the foregoing embodiments. It will be understood by those of ordinary skill in the art that various changes in form and details may be made therein without departing form the spirit and scope the present invention as defined by the claims.

The invention claimed is:

1. A software IC card system comprising a terminal, a service providing server for providing a service to the terminal, and a management server for managing software for providing the service, said software IC card system characterized in that:

said terminal provides a first electronic signature to user information which enables a user to be identified, and transmits the user information appended with the first electronic signature to said management server, said management server calculates a hash value for the software, provides a second electronic signature to the software, generates a first software area from the software, which has been provided with the second electronic signature, provides a third electronic signature to the user information provided with the first electronic signature, to the hash value and to user management information for managing the user, generates a second software area from: (a) the user information provided with the third electronic signature and the first electronic signature, (b) the hash value, and (c) the user management information, encrypts the second software area using a key common to said management server and said service providing server, combines the first software area and the encrypted second software area to create a software IC card, encrypts the created software IC card using a public key of said terminal, and transmits the software IC card to said terminal.

2. The software IC card system according to claim 1, characterized in that:

when said terminal makes a request to said management server for the software IC card, said management server transmits the software IC card to said terminal.

3. The software IC card system according to claim 1, characterized in that:

said terminal uses a secret key of said terminal itself to generate the first electronic signature, wherein the secret key is stored in a hardware security module uniquely mounted in said terminal.

4. The software IC card system according to claim 1, characterized in that:

said terminal decrypts a software IC card transmitted thereto using the secret key of said terminal itself, and transmits the decrypted software IC card to said service providing server, and said service providing server verifies whether or not the second electronic signature of a software IC card transmitted from said terminal is attached by said management server, decrypts the second software area using the common key, verifies whether or not the third electronic signature is attached by said management server and also verifies whether or not said first electronic signature is attached by said terminal which transmitted the software IC card, and provides a service to said terminal when the results of all the verifications are correct.

5. The software IC card system according to claim 1, characterized in that:

said terminal decrypts a software IC card transmitted thereto from said management server, updates a third software area of the decrypted software IC card, encrypts the updated software IC card, and transmits the encrypted software IC card to said management server.

6. The software IC card system according to claim 4, characterized in that:

said terminal decrypts the software IC card transmitted thereto using the decryption key of said terminal itself stored in said hardware security module uniquely mounted in said terminal.

7. The software IC card system according to claim 3, characterized in that:

said hardware security module is Trust Platform Module ("TPM").

8. A management server for managing software that provides a service from a service providing server to a terminal which transmits user information appended with a first electronic signature, wherein:

said management server calculates a hash value for the software, provides a second electronic signature to the software, generates a first software area from the software, which has been provided with the second electronic signature, provides a third electronic signature to the user information provided with the first electronic signature, to the hash value and to user management information for managing the user, generates a second software area from: (a) the user information provided with the third electronic signature and the first electronic signature, (b) the hash value, and (c) the user management information, encrypts the second software area using a key common to said management server and said service providing server, combines the first software area and the encrypted second software area to create a software IC card, encrypts the created software IC card using a public key of said terminal, and transmits the software IC card to said terminal.

9. The management server according to claim 8, characterized by:

transmitting when said terminal makes a request to said management server for the software IC card.

10. A service providing method in a software IC card system comprising a terminal, a service providing server that provides a service to said terminal, and a management server for managing software for providing the service, said service providing method comprising the processing of:

said terminal providing a first electronic signature to user information which enables a user to be identified;

said terminal transmitting the user information appended with the first electronic signature to said management server;

said management server calculating a hash value for the software;

said management server providing a second electronic signature to the software;

said management server generating a first software area from the software, which has been provided with the second electronic signature;

said management server providing a third electronic signature to the user information provided with the first electronic signature, to the hash value, and to user management information for managing the user;

said management server generating a second software area from: (a) the user information provided with the third electronic signature and the first electronic signature, (b) the hash value, and (c) the user management information;

said management server encrypting the second software area using a common key of said management server and said service providing server;

said management server combining the first software area and the encrypted second software area to create a software IC card;

said management server encrypting the created software IC card using a public key of said terminal; and said management server transmitting the software IC card to said terminal.

11. The service providing method according to claim 10, characterized by comprising the processing of:

said management server transmitting the software IC card to said terminal when said terminal makes a request to said management server for the software IC card.

12. The service providing method according to claim 10, characterized by comprising the processing of:

said terminal uses a secret key of said terminal itself to generate the first electronic signature, wherein the is stored in a hardware security module uniquely mounted in said terminal.

13. The service providing method according to claim 10, characterized by comprising the processing of:

said terminal, when a requested software IC card is transmitted from said management server, decrypting a software IC card transmitted thereto using the secret key of said terminal itself;

said terminal transmitting the decrypted software IC card to said service providing server;

said service providing server verifying whether or not the second electronic signature of a software IC card transmitted from said terminal is attached by said management server;

said service providing server decrypting the second software area using the common key;

said service providing server verifying whether or not the third electronic signature is attached by said management server;

said service providing server verifying whether or not said first electronic signature is attached by said terminal which transmitted the software IC card; and said service providing server providing a service to said terminal when the results of all the verifications are correct.

14. The service providing method according to claim 10, characterized by comprising the processing of:

said terminal decrypting a software IC card transmitted thereto from said management server;

said terminal updating a third software area of the decrypted software IC card;

said terminal encrypting the updated software IC card; and said terminal transmitting the encrypted software IC card to said management server.

15. The service providing method according to claim 13, characterized by comprising the processing of:

said terminal decrypting the software IC card transmitted thereto using the decryption key of said terminal itself stored in said hardware security module uniquely mounted in said terminal.

16. A non-transitory computer-readable recording medium storing a program for causing a management server for managing software for providing a service from a service providing server to a terminal which transmits user information appended with a first electronic signature, to execute the procedures of:

calculating a hash value for the software;

providing a second electronic signature to the software;

generating a first software area from the software, which has been provided with the second electronic signature;

providing a third electronic signature to the user information provided with the first electronic signature, to the hash value, and to user management information for managing the user;

generating a second software area from: (a) the user information provided with the third electronic signature and the first electronic signature, (b) the hash value, and (c) the user management information;

encrypting the second software area using a common key of said management server and said service providing server;

combining the first software area and the encrypted second software area to create a software IC card;

encrypting the created software IC card using a public key of said terminal; and transmitting the software IC card to said terminal.

17. The non-transitory computer-readable recording medium according to claim 16, characterized by storing a program for causing said management server to execute the procedure of:

transmitting the software IC card to said terminal when said terminal makes a request to said management server for the software IC card.

* * * * *